(12) United States Patent
Wu et al.

(10) Patent No.: US 8,796,983 B2
(45) Date of Patent: Aug. 5, 2014

(54) METHOD AND SYSTEM FOR DETERMINING A POSITION OF A ROTOR OF AN ELECTRIC MOTOR WITH NOISE REDUCTION

(75) Inventors: Long Wu, Fargo, ND (US); Robert Shaw, Moorhead, MN (US)

(73) Assignee: Deere & Company, Moline, IL (US)

( * ) Notice: Subject to any disclaimer, the term of this patent is extended or adjusted under 35 U.S.C. 154(b) by 322 days.

(21) Appl. No.: 13/169,495

(22) Filed: Jun. 27, 2011

(65) Prior Publication Data
US 2012/0217913 A1 Aug. 30, 2012

Related U.S. Application Data

(60) Provisional application No. 61/446,115, filed on Feb. 24, 2011.

(51) Int. Cl.
*H02P 1/46* (2006.01)
*H02P 21/14* (2006.01)
*H02P 6/20* (2006.01)

(52) U.S. Cl.
CPC ............... *H02P 21/145* (2013.01); *H02P 6/20* (2013.01)
USPC ............... 318/721; 318/400.04; 318/400.29

(58) Field of Classification Search
USPC .......... 318/721, 400.04, 400.29, 701, 400.13, 318/599, 720
See application file for complete search history.

(56) References Cited

U.S. PATENT DOCUMENTS

| | | | |
|---|---|---|---|
| 4,023,083 A | 5/1977 | Plunkett |
| 4,814,677 A | 3/1989 | Plunkett |
| 5,428,283 A | 6/1995 | Kalman et al. |
| 5,486,748 A | 1/1996 | Konrad et al. |
| 5,914,582 A | 6/1999 | Takamoto et al. |
| 6,005,364 A | 12/1999 | Acarnley |
| 6,275,000 B1 | 8/2001 | Nishimura |
| 7,045,988 B2 | 5/2006 | Ha et al. |
| 7,157,878 B2 | 1/2007 | Collier-Hallman |

(Continued)

OTHER PUBLICATIONS

Elbuluk, Malik E. et al. Speed Sensorless Induction Motor Drives for Electrical Actuators: Schemes. Trends and Tradeoffs. NASA Technical Memorandum 107466. Retrieved from the Internet:<URL:http://www.esat.kuleuven.be/electa/publications/fulltexts/pub_479.pdf>, Jul. 1997.

(Continued)

*Primary Examiner* — Karen Masih (57) ABSTRACT

A data storage device stores previous position readings of the rotor for a previous cycle of a pulse width modulation signal applied to the motor. A current raw position reading for the current cycle is received. A predicted position reading for a current cycle is determined based on at least one of the stored previous position readings of the previous cycle. A data processor determines whether a difference between the current raw position reading and the predicted position reading for a first mode and a second mode is within one or more preset thresholds. The data processor selects the current raw position reading as a verified reliable final position reading if a first difference for the first mode is equal to or less than a primary preset threshold or if a second difference for the second mode is equal to or less than a secondary preset threshold.

22 Claims, 8 Drawing Sheets

(56) References Cited

U.S. PATENT DOCUMENTS

| | | |
|---|---|---|
| 7,733,044 B2 | 6/2010 | Nakamura et al. |
| 7,755,317 B2 | 7/2010 | Yu et al. |
| 2004/0036436 A1 | 2/2004 | Tieu |
| 2004/0245983 A1* | 12/2004 | Mayes .................... 324/207.16 |
| 2006/0056821 A1 | 3/2006 | Hornberger et al. |
| 2006/0247829 A1 | 11/2006 | Sato |
| 2010/0181952 A1 | 7/2010 | Cheng |
| 2010/0188033 A1 | 7/2010 | Daboussi et al. |
| 2011/0006714 A1 | 1/2011 | Hui |
| 2011/0010479 A1 | 1/2011 | Oyama et al. |

OTHER PUBLICATIONS

US 7,595,604, 9/2009, Tomigashi (withdrawn).

Van Haute, S. et al. Design and Control of a Permanent Magnet Synchronous Motor Drive for a Hybrid Electric Vehicle. Retrieved from the Internet:<URL:http://www.esat.kuleuven.be/electa/publications/fulltexts/pub_444.pdf>.

The International Search Report and the Written Opinion of the International Searching Authority, Jun. 20, 2012 (14 pages).

The International Preliminary Report on Patentability and the Written Opinion of the International Searching Authority, Jan. 28, 2014 (13 pages).

* cited by examiner

METHOD AND SYSTEM FOR DETERMINING A POSITION OF A ROTOR OF AN ELECTRIC MOTOR WITH NOISE REDUCTION

This document claims priority based on U.S. provisional application Ser. No. 61/446,115, filed on 24 Feb. 2011 and entitled METHOD AND SYSTEM FOR DETERMINING A POSITION OF A ROTOR OF AN ELECTRIC MOTOR WITH NOISE REDUCTION, under 35 U.S.C. 119(e).

FIELD OF THE INVENTION

This invention relates to a method and system for determining a position of a rotor in an electric motor with noise reduction.

BACKGROUND OF THE INVENTION

An electric motor may feature a rotor with permanent magnets and a stator, such as an interior permanent magnet (IPM) motor or an IPM synchronous motor. In accordance with certain prior art, a position sensor or resolver for determining a position of the rotor or motor shaft may be associated with noise that can interfere with or corrupt one or more position readings. If the resolver is not a brushless resolver, the noise may be generated at the electrical and mechanical interface of an armature or brushes of a resolver, for instance. Even brushless resolvers or other position sensors may be impacted by noise from numerous sources. For example, parasitic or transient motor electromagnetic fields may be induced into proximate electrical components of the sensor or the electronic hardware. In addition, the switching actions of power switches in the inverter, such as insulated gate bipolar transistors (IGBT), tend to introduce significant electromagnetic interference or noise to resolver position signal. Accordingly, to the extent that the noise contributes to an inaccurate position reading, the control signals applied to the motor tend to be inaccurate from time to time. Thus, there is a need for an improved method and system for determining a position of a rotor in an electric motor with noise reduction.

SUMMARY OF THE INVENTION

In accordance with one embodiment, a method and system is presented for determining a position of a rotor in an electric motor with noise reduction. A data storage device stores previous position readings of the rotor for a previous cycle of a pulse-width-modulation signal applied to the motor. A current raw position reading for the current cycle is received. A predicted position reading for a current cycle is determined based on at least one of the stored previous position readings of the previous cycle. The predicted position reading comprises the previous cycle final selected position for a first mode and the previous cycle raw position for a second mode. A processing module or data processor determines one or more of the following: (1) whether a first difference between the current raw position reading and the predicted position reading for the first mode is within a primary preset threshold and (2) whether a second difference between the current raw position reading and the predicted position reading for the second mode is within the secondary preset threshold. The processing module or the data processor selects the current raw position reading as a verified reliable final position reading for the current cycle if the difference for the first mode is equal to or less than the primary preset threshold or if the second difference for the second mode is equal to or less than the secondary preset threshold. Otherwise, in one illustrative example, the predicted position reading for the first mode will be selected as the final position for the current cycle.

DESCRIPTION OF THE PREFERRED EMBODIMENT

Figure 1:
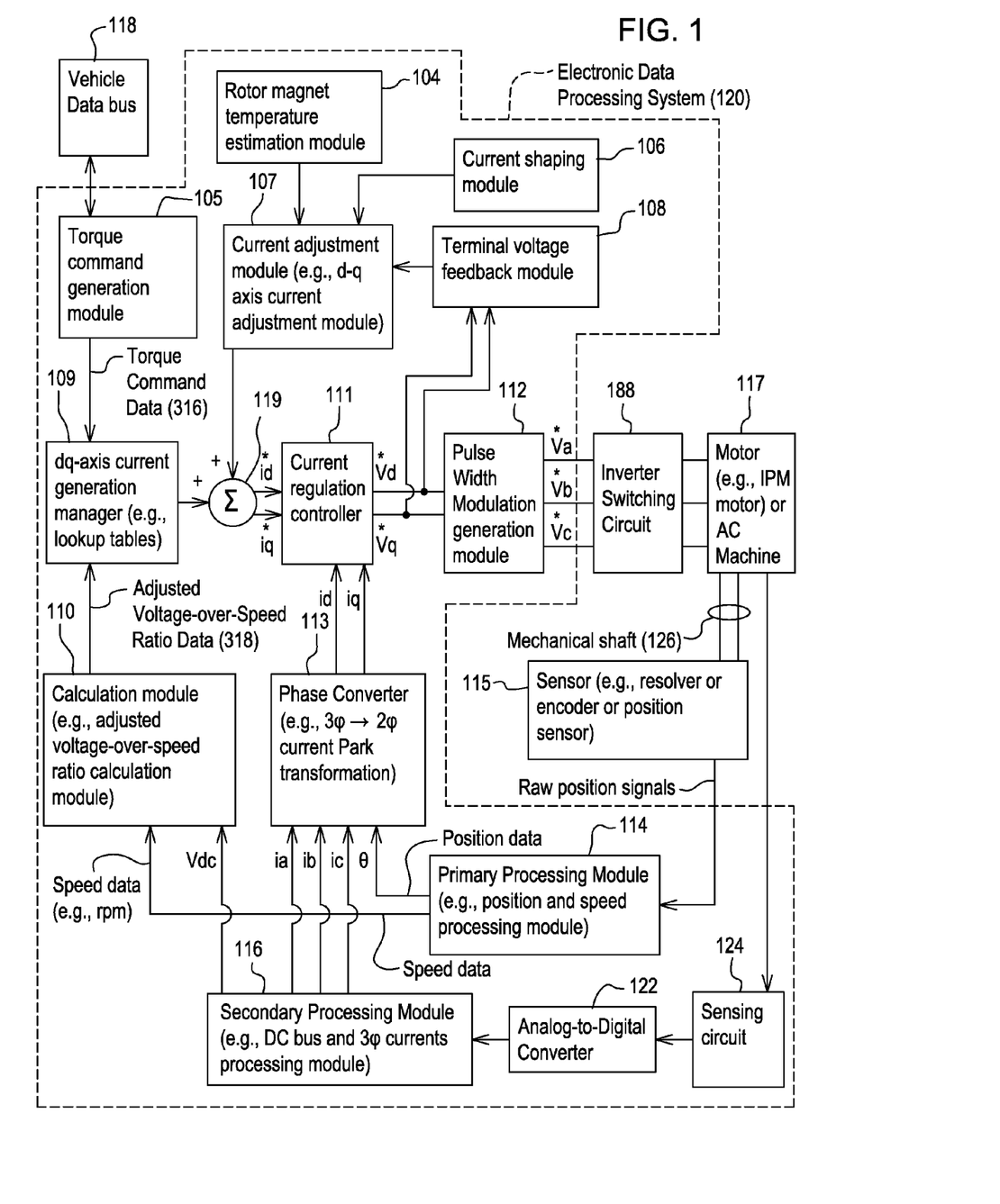
FIG. 1 is a block diagram of one embodiment of a system for controlling an electrical motor with noise reduction for position sensing.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the motor 117. In turn, the inverter circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current data ($i_d^*$) and quadrature axis current data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the motor 117. The PWM generation module 112 provides inputs to a driver stage within the inverter circuit 188. An output stage of the inverter circuit 188 provides a modulated signal, a pulse-width modulated signal, a pulse-width modulated voltage waveform, a voltage signal, or other alternating current signal for control of the motor. In one embodiment, the inverter 188 is powered by a direct current (DC) voltage bus.

The motor 117 is associated with a sensor 115 (e.g., a resolver, encoder, speed sensor, or a position sensor or sensors) that estimates at least one of an angular position of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the motor 117.

In one alternate embodiment, the rotor magnet temperature estimation module 104 may be replaced by or may estimate the temperature of the rotor magnets from one or more sensors located on the stator, in thermal communication with the stator, or secured to the housing of the motor 117.

In another alternative embodiment, the rotor magnet temperature estimation module 104 may be replaced with a temperature detector (e.g., a thermistor or infrared thermal sensor coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104, the current shaping module 106, and the terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on a controller voltage command versus voltage limit. The current adjustment module 107 may provide an aggregate current adjustment that considers one or more of the following adjustments: a preliminary adjustment, a secondary adjustment, and a third adjustment.

In one embodiment, the motor 117 may comprise an interior permanent magnet (IPM) machine or an IPM synchronous machine (IPMSM). An IPMSM has many favorable advantages compared with conventional induction machines or surface mounted permanent magnet (SMPM) machines such as high efficiency, high power density, wide constant power operating region, and maintenance free, for instance.

The sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data and associated time data are processed to determine speed or velocity data for the motor shaft 126. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the sensor 115 comprises a resolver with a first winding and a second winding, where the first winding is fed with an alternating current, where the voltage induced in the second winding varies with the frequency of rotation of the rotor.

Figure 2:
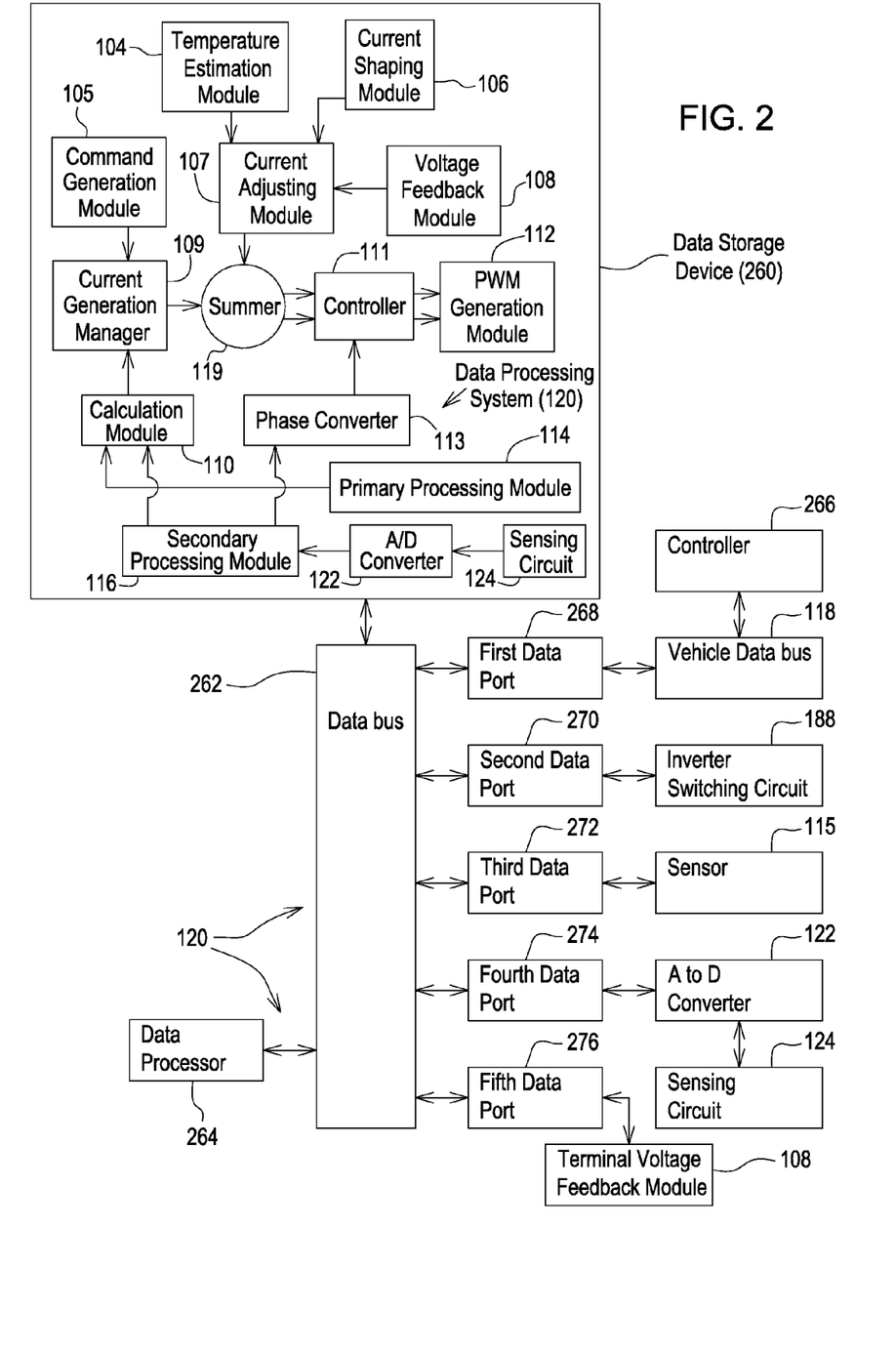
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the data processing system 120.

In one embodiment, a system of determining a position of a rotor in a motor 117 comprises a data storage device 260 for storing a plurality of previous position readings of the rotor for a previous cycle of a pulse width modulation signal applied to the motor. The previous position readings comprise a previous cycle final selected position and a previous cycle raw position. A data port (e.g., third data port 272) is configured for receiving a current raw position reading for the current cycle from a sensor 115. A data processor 264 is adapted for executing software instructions within a primary processing module 114 for determining a predicted position reading for a current cycle based on at least one of the plurality of stored previous position readings of the previous cycle. The predicted position reading comprises the previous cycle final selected position for a first mode and the previous cycle raw position for a second mode. The primary processing module 114 or the data processor 264 is adapted to determine whether a difference between the current raw position reading and the predicted position reading for the first mode and the second mode is within a preset threshold. The primary processing module 114 or the data processor 264 is adapted to select the current raw position reading as a verified reliable final position reading if the difference is equal to or less than the preset threshold (e.g., the primary preset threshold, the secondary preset threshold or both).

In one arrangement, the primary data processing module 114 or the data processor 264 is adapted to select the verified reliable final position reading by evaluation of a first difference between the current raw position reading and the predicted position based on previous cycle final selected position and a second difference between the predicted position based on current raw position reading and the previous cycle raw position. In another arrangement, the primary data processing module 114 or the data processor 264 is adapted to select the current raw position as the verified reliable final position reading if at least one of the first difference or the second difference is less than or equal to than the preset threshold. In yet another arrangement, the primary data processing module 114 or the data processor 264 is adapted to select the predicted position based on previous cycle final selected position as the verified reliable final position reading of current cycle if each of the first difference and the second difference is greater than the preset threshold. In yet another arrangement, the primary data processing module 114 or the data processor 264 is adapted to select the predicted position based on previous cycle raw position as the verified reliable final position reading of current cycle if each of the first difference and the second difference is less than or equal to the preset threshold.

Figure 3:
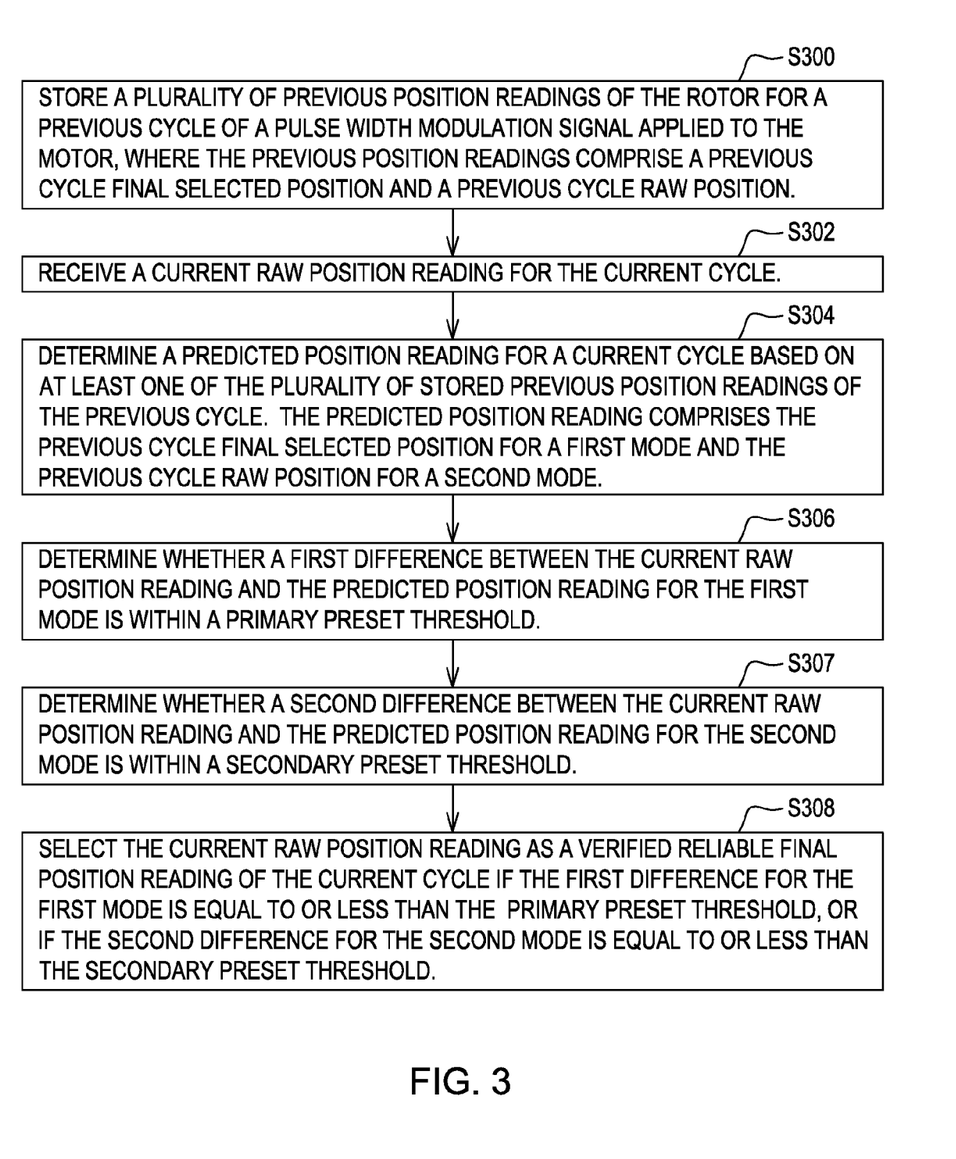
FIG. 3 is a flow chart of a first embodiment of a method for controlling an electrical motor with noise reduction for position sensing.

FIG. 3 discloses a first embodiment of a method for determining a position of a rotor in an electric motor with noise reduction. As used in FIG. 4, any steps that are executed by the data processing system 120 may be executed by the data processor 264, whether by execution of software instructions (e.g., primary processing module) stored in the data storage device 260 on a permanent or non-transitory basis, or otherwise. The method of FIG. 3 begins in step S300.

In step S300, a data storage device 260, a data processing system 120, or a primary processing module 114 stores a plurality of previous position readings of the rotor for a previous cycle of a pulse-width-modulation signal applied to the motor 117, where the previous position readings comprise a previous cycle final selected position and a previous cycle raw position.

In step S302, a data processing system 120 or primary processing module 114 receives a current raw position reading for the current cycle. For example, the sensor 115 provides the current raw position reading for the current cycle (e.g., pulse of a pulse-width modulation signal applied to the motor 117).

In step S304, a data processing system 120 or primary processing module 114 determines a predicted position reading for a current cycle based on at least one of the plurality of stored previous position readings of the previous cycle. Further, the predicted position reading comprises the previous cycle final selected position for a first mode and the previous cycle raw position for a second mode.

Step S304 may be executed in accordance with various procedures that may be applied alternately or cumulatively. Under a first procedure, the data processing system 120 or the primary processing module 114 determines the predicted position reading for the current cycle based on the stored previous final position reading from the previous cycle and a previous speed reading from the previous cycle. Under a second procedure, the data processing system 120 or the primary processing module 114 determines the predicted position reading for the current cycle is determined by the following equation, which is applicable to the first mode and the second mode:

$$Pos\_pred\_2 = Pos\_1 + Spd\_read\_1 * P1,$$

where $Pos\_pred\_2$ is the predicted position reading for the current cycle, $Pos\_1$ is the previous raw position reading for the previous cycle, $Spd\_read\_1$ is the previous speed reading from the previous cycle, and P1 is the time difference between position reading times for the previous cycle and the current cycle.

For the first mode, the equation is restated as follows:

$$Pos\_pred\_2a = Pos\_1a + Spd\_read\_1 * P1,$$

where $Pos\_pred\_2a$ is the predicted position reading for the current cycle based on previous cycle raw position, $Pos\_1a$ is the previous raw position reading for the previous cycle, $Spd\_read\_1$ is the previous speed reading from the previous cycle, and P1 is the time difference between raw position reading times for the previous cycle and the current cycle.

For the second mode, the predicted position reading for the current cycle is determined by the following equation:

$$Pos\_pred\_2b = Pos\_1b + Spd\_read\_1 * P1,$$

where $Pos\_pred\_2b$ is the predicted position reading for the current cycle based on previous cycle final selected position, $Pos\_1b$ is the final selected position reading for the previous cycle, $Spd\_read\_1$ is the previous speed reading from the previous cycle, and P1 is the time difference between raw position reading times for the previous cycle and the current cycle.

In step S306, the data processor 264, the data processing system 120, or the primary processing module 114 determines whether a first difference between the current raw position reading and the predicted position reading for the first mode is within a primary preset threshold. The current raw position reading is generally supplied by the sensor 115. The previous cycle raw position data and the previous cycle final selected position data may be stored at the sensor 115, by the primary processing module 114, or within the data storage device 260, for example. The primary preset threshold may be defined as an angular measurement or displacement (e.g., in degrees or radians). The primary preset threshold may be determined by empirical tests, or may be established as respective tolerances that apply to certain corresponding models or configuration of electrical motors 117. In one example, the primary preset threshold comprises a tolerance of plus or minus three electrical degrees of rotor rotation with respect to the stator, although other primary preset thresholds fall within the scope of the claims at the end of this document.

In step S307, the data processor 264, the data processing system 120, or the primary processing module 114 determines whether a second difference between the current raw position reading and the predicted position reading for the second mode is within a secondary preset threshold. The current raw position reading is generally supplied by the sensor 115. The previous cycle raw position data and the previous cycle final selected position data may be stored at the sensor 115, by the primary processing module 114, or within the data storage device 260, for example. The secondary preset threshold may be defined as an angular measurement or displacement (e.g., in degrees or radians). The secondary preset threshold may be determined by empirical tests, or may be established as respective tolerances that apply to certain corresponding models or configuration of electrical motors 117. In one example, the secondary preset threshold comprises a tolerance of plus or minus three electrical degrees of rotor rotation with respect to the stator, although other primary preset thresholds fall within the scope of the claims at the end of this document.

In step S308, the data processor 264, the data processing system 120, or the primary processing module 114 selects the current raw position reading as a verified reliable final position reading of the current cycle (e.g., PWM cycle) if the first difference for the first mode is equal to or less than the primary preset threshold, or if the second difference for the second mode is equal to or less than the secondary preset threshold. Otherwise, the data processor 264, the data processing system 120, or the primary processing module 114 selects other data (e.g., the predicted position based on previous cycle final selected position or the predicted position based on previous cycle raw position reading) as the verified reliable position reading based on the difference, as described in more detail as set forth below.

In one example, the primary preset threshold and the secondary preset threshold may each comprise a tolerance of plus or minus three electrical degrees of rotor rotation with respect to the stator, although other preset thresholds fall within the scope of the claims at the end of this document. In one configuration, the primary preset threshold may be set equal to the secondary preset threshold, although the primary preset threshold and the secondary preset threshold may be adjusted separately or set independently of each other.

Figure 4:
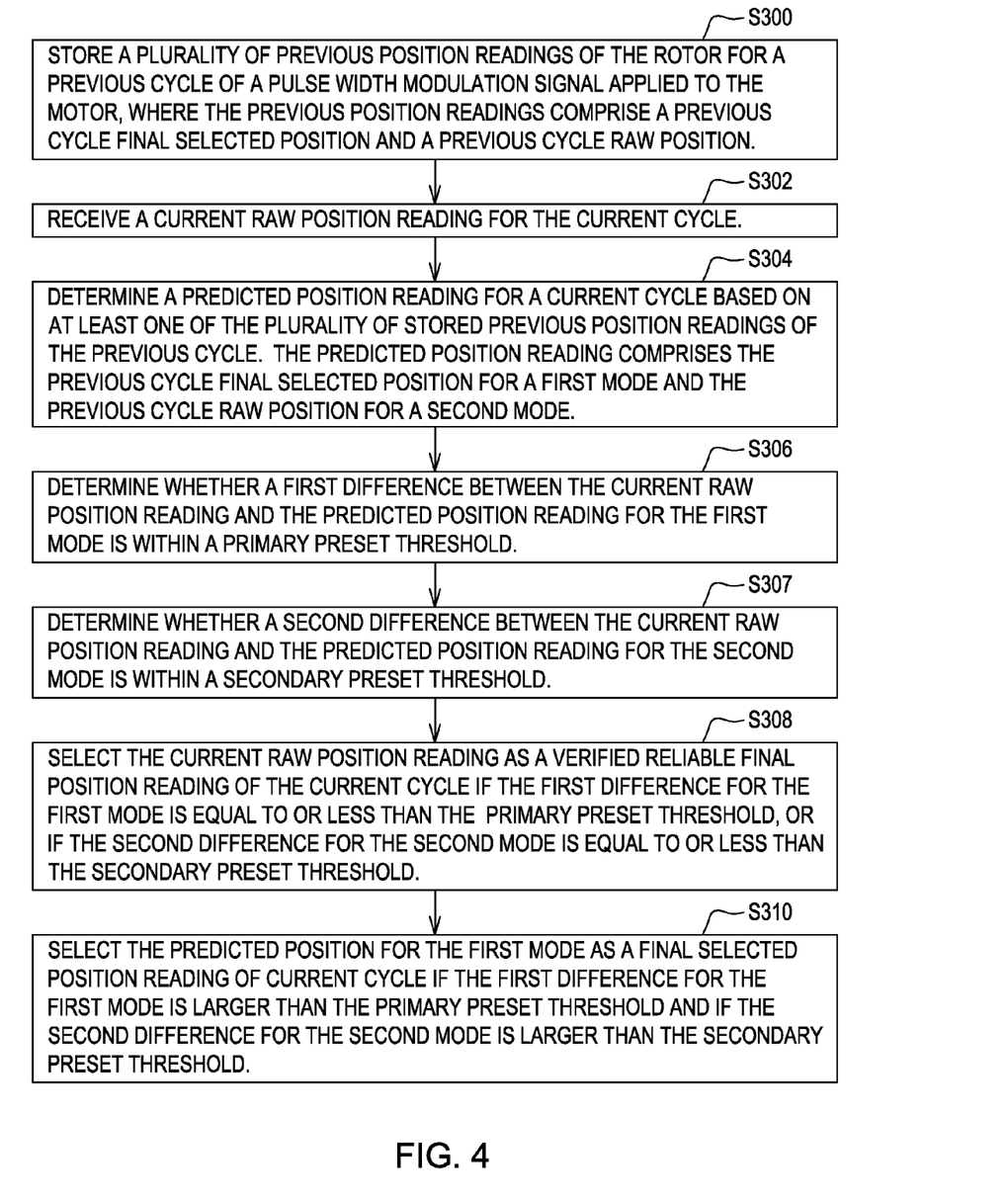
FIG. 4 is a flow chart of a second embodiment of a method for controlling an electrical motor with noise reduction for position sensing.

FIG. 4 discloses a second embodiment of a method for determining a position of a rotor in an electric motor with noise reduction. Like reference numbers in FIG. 3 and FIG. 4 indicate like steps or procedures. The method of FIG. 4 is similar to the method of FIG. 3, except the method of FIG. 4 further comprises step S310.

In step S310, the data processor 264, the data processing system 120, or the primary processing module 114 selects the predicted position for the first mode as a final selected position reading of a current cycle (e.g., current PWM cycle) if the first difference for the first mode is larger than the primary preset threshold and if the second difference for the second mode is larger than the secondary preset threshold. In one configuration, the primary preset threshold may be set equal to the secondary preset threshold, although the primary preset threshold and the secondary preset threshold may be adjusted separately or set independently of each other.

Figure 5:
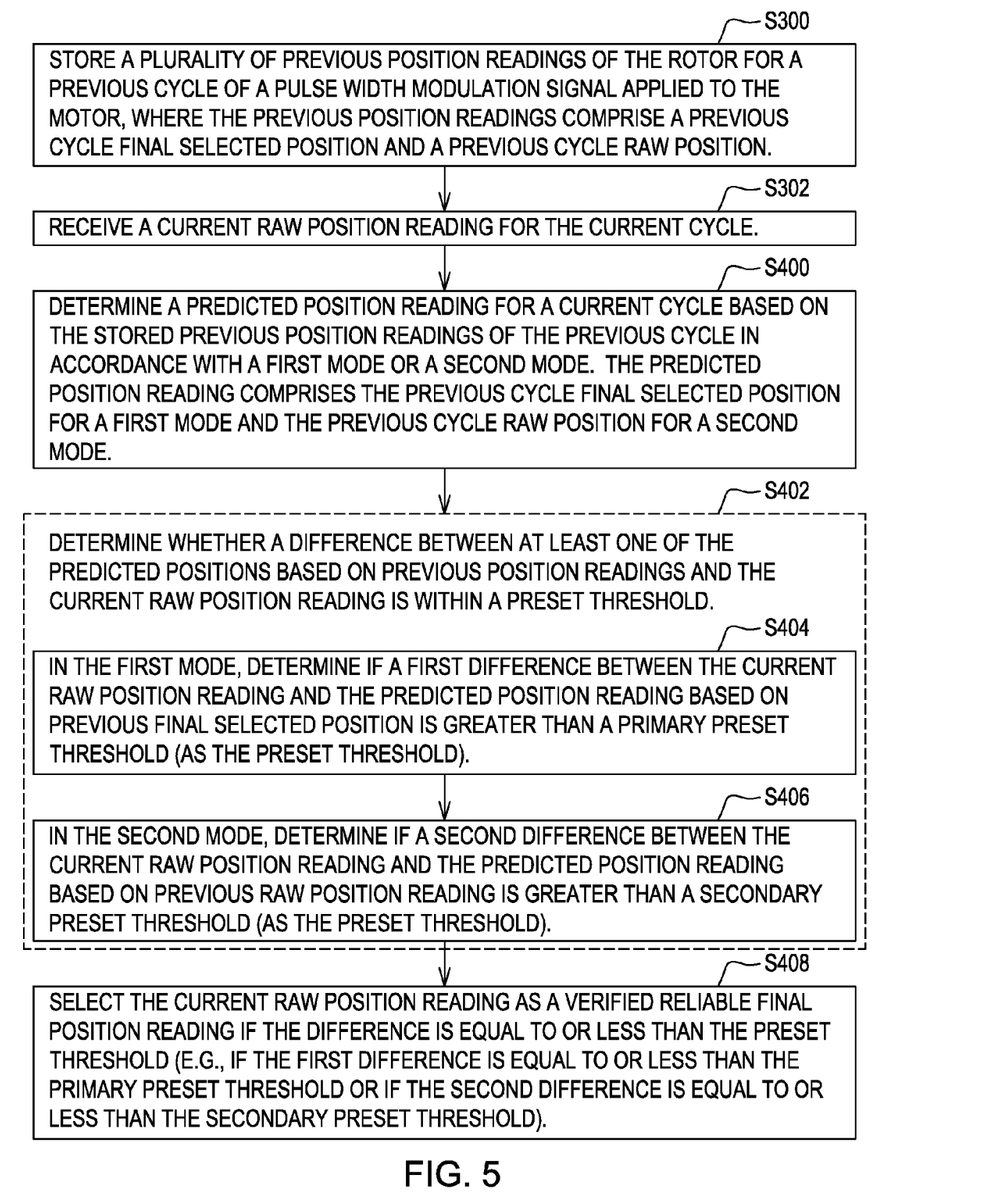
FIG. 5 is a flow chart of a third embodiment of a method for controlling an electrical motor with noise reduction for position sensing.

FIG. 5 discloses a third embodiment of a method for determining a position of a rotor in an electric motor with noise reduction. Like reference numbers in FIG. 3 and FIG. 5 indicate like steps or procedures.

The method of FIG. 5 begins in step S300. In step S300, a data storage device 260, a data processing system 120, or a primary processing module 114, stores a plurality of previous position readings of the rotor for a previous cycle of a pulse-width-modulation (PWM) signal applied to the motor 117, where the previous position readings comprise a previous cycle final selected position and a previous cycle raw position.

In step S302, a data processing system 120 or primary processing module 114 receives a current raw position reading for the current cycle. For example, the sensor 115 provides the current raw position reading for the current cycle (e.g., pulse of a pulse-width modulation signal applied to the motor 117).

In step S400, the data processing system 120 or the primary processing module 114 determines a predicted position reading for a current cycle (e.g., pulse width modulation (PWM) cycle) based on the stored previous position readings of the previous cycle in accordance with a first mode or a second mode. Further, the predicted position reading comprises the previous cycle final selected position for a first mode and the previous cycle raw position for a second mode. The data processing system 120 or the primary processing module 114 may store the previous position readings in the data storage device 260, for example.

In an alternate embodiment, the data processing system 120 or the primary processing module 114 determines the predicted position reading for the current cycle based on the stored previous position reading from the previous cycle and a previous speed reading from the previous cycle. Accordingly, the equations described in conjunction with step S304 in FIG. 4 may be applied to step S400.

In step S402, the data processing system 120 or the primary processing module 114 determines whether a difference (e.g., a first difference, a second difference, or both) between at least one of the previous position readings (based on previous position readings) and the current raw position readings is within a preset threshold (e.g., primary preset threshold or the secondary preset threshold). For example, the data processing system 120 or the primary processing module 114 may retrieve the previous position readings from the data storage device 260 for comparison with the current raw position readings received from the sensor 115. In step S402 and elsewhere in the document, the difference may refer to the first difference, the second difference, or both.

The method of FIG. 5 uses one or more preset thresholds. The term, "preset threshold," may refer to any of the primary preset threshold, the secondary preset threshold, or both. For example, the preset thresholds may comprise a primary preset threshold, and a secondary preset threshold. In one example, the primary preset threshold, and the secondary preset threshold may each comprise a tolerance of plus or minus three electrical degrees of rotor rotation with respect to the stator, although other preset thresholds fall within the scope of the claims at the end of this document. In one configuration, any preset threshold may be set to be approximately equal to any other preset threshold, although the primary preset threshold and the secondary preset threshold may be adjusted separately or set independently of each other.

Step S402 is indicated by the dashed lines in FIG. 5 that encompass step S404 and step S406. In one embodiment, step S402 may be carried by step S404 for the determination in the first mode and step S406 for the determination in the second mode. In step S404, in the first mode, the data processing system 120 or the primary processing module 114 determines if a first difference between the current raw position reading and the predicted position based on previous final selected position is greater than a secondary preset threshold. For example, the data processing system 120 or the primary processing module 114 may retrieve the predicted position based on previous final selected position from the data storage device 260 for comparison with the current raw position reading received from the sensor 115.

In step S406, in the second mode, the data processing system 120 or the primary processing module 114 determines if a second difference between the current raw position reading and predicted position based on the previous raw position reading is greater than a secondary preset threshold.

In step S408, the data processing system 120 or the primary processing module 114 selects the current raw position reading as a verified reliable position reading if the difference (e.g., the first difference, the second difference or both) is equal to or less than the preset threshold, or the data processing system 120 selects another verified reliable position based on evaluation of the first difference and the second difference. Step S408 may be carried out in accordance with various techniques that may be applied alternately or cumulatively.

Under a first technique, the data processing system 120 or the primary processing module 114 selects the current raw position reading as a verified reliable position reading of the current cycle (e.g., pulse width modulation cycle) if the first difference or the second difference is equal to or less than a primary preset threshold or the secondary preset threshold, respectively.

Under second technique, the primary preset threshold may be set to be approximately equal to the secondary preset threshold, although the primary preset threshold and the secondary present threshold may be adjusted separately or set independently of each other.

Under a third technique, the data processing system 120 or the primary processing module 114 selects the verified reliable final position reading of current cycle by evaluation of a first difference between the current raw position reading and the current predicted position based on previous cycle final selected position and a second difference between the current raw position reading and the current predicted position based on previous cycle raw position.

Under a fourth technique, the data processing system 120 or the primary processing module 114 selects the predicted position (based on the previous final selected position reading) as the verified reliable final position reading of the current cycle (e.g., current PWM cycle) if the first difference is greater than the primary preset threshold and if the second difference is greater than the secondary preset threshold.

Figure 6:
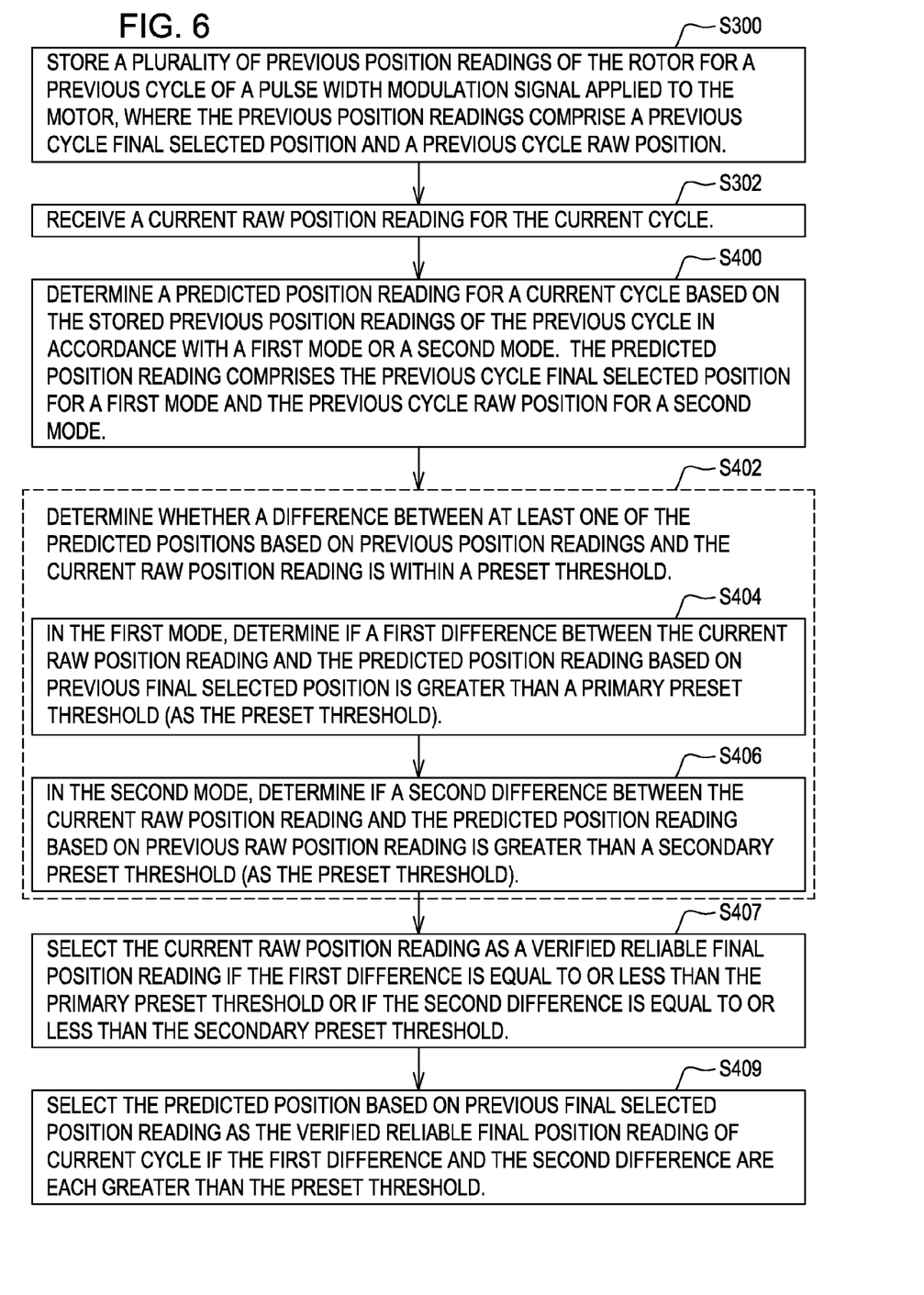
FIG. 6 is a flow chart of a fourth embodiment of a method for controlling an electrical motor with noise reduction for position sensing.

The method of FIG. 6 is similar to the method of FIG. 5, except the method of FIG. 6 replaces step S408 with step S407 and adds step S409. Like reference numbers in FIG. 5 and FIG. 6 indicate like procedures or steps.

In step S407, the data processing system 120, the data processor 264, or the primary processing module 114 selects the current raw position reading as a verified reliable position reading if the first difference is equal to or less than the primary preset threshold or if the second difference is equal to or less than a secondary preset threshold. In one configuration, the primary preset threshold may be set to be approximately equal to the secondary preset threshold, although the primary preset threshold and the secondary present threshold may be adjusted separately or set independently of each other.

In step S409, the data processing system 120, the data processor 264 or the primary processing module 114 selects the predicted position based on the previous final selected position reading (of the previous cycle) as the verified reliable final position reading of the current cycle (e.g., current PWM cycle) if both the first difference and the second difference are each greater than the preset threshold. For example, the data processing system 120, the data processor 264 or the primary processing module 114 selects the predicted position based on the previous final selected position reading as the verified reliable final position reading of the current cycle (e.g., current PWM cycle) if the first difference is greater than the primary preset threshold and if the second difference is greater than the secondary preset threshold.

Figure 7:
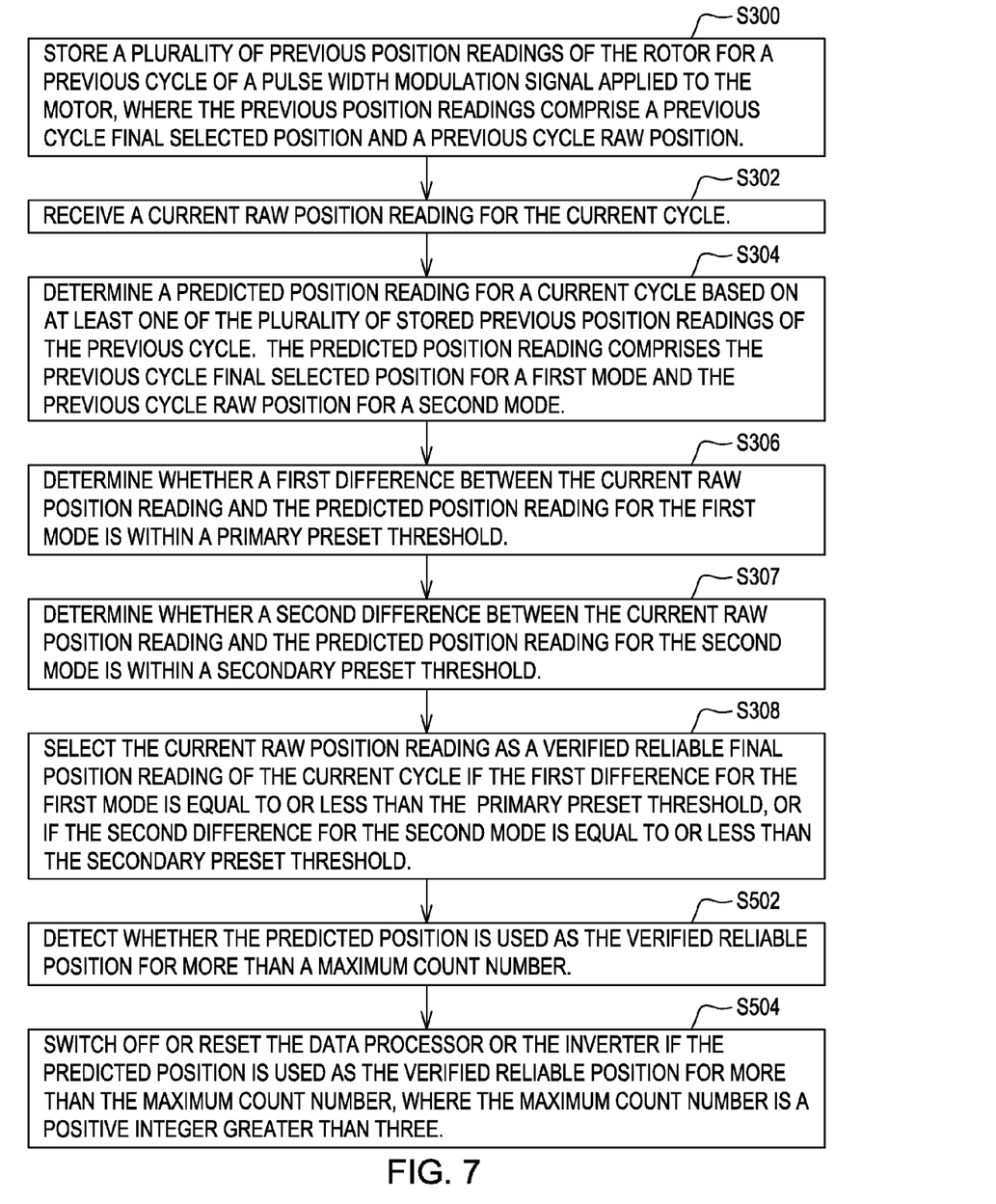
FIG. 7 is a flow chart of a third embodiment of a method for controlling an electrical motor with noise reduction for position sensing.

The method of FIG. 7 is similar to the method of FIG. 3, except the method of FIG. 7 includes additional steps S502 and S504. Like reference numbers indicate like steps or procedures in FIG. 3 and FIG. 5.

Steps S300, S302, S304, S306, and S308 are described above in conjunction with FIG. 3.

In step S502, the data processing system 120, the data processor 264 or the primary processing module 114 detects whether the predicted position is consecutively used as the verified reliable position for more than a maximum count number. The data processing system 120 or the primary processing module 114 may comprise a counter (e.g., via the data processor 264) for tracking the maximum count number during a time period. The time period may be defined in accordance with a number of PWM pulse cycles or in accordance with a data clock, or a time clock.

In step S504, the data processing system 120, the data processor 264 or the primary processing module 114 switches off or resets the controller, the data processor 264 or the data processing system 120 if the predicted position is consecutively used as the verified reliable position for more than the maximum count number, where the maximum count number is a positive integer greater than three. In one embodiment, a count number that exceeds the maximum count number may indicate that the data processor 264 is receiving corrupt data (e.g., rotor speed data) from the sensor 115 or that one or more registers of the data processor 264 or the data storage device 260 contain corrupt position or speed data for the motor shaft of the motor 117.

Figure 8:
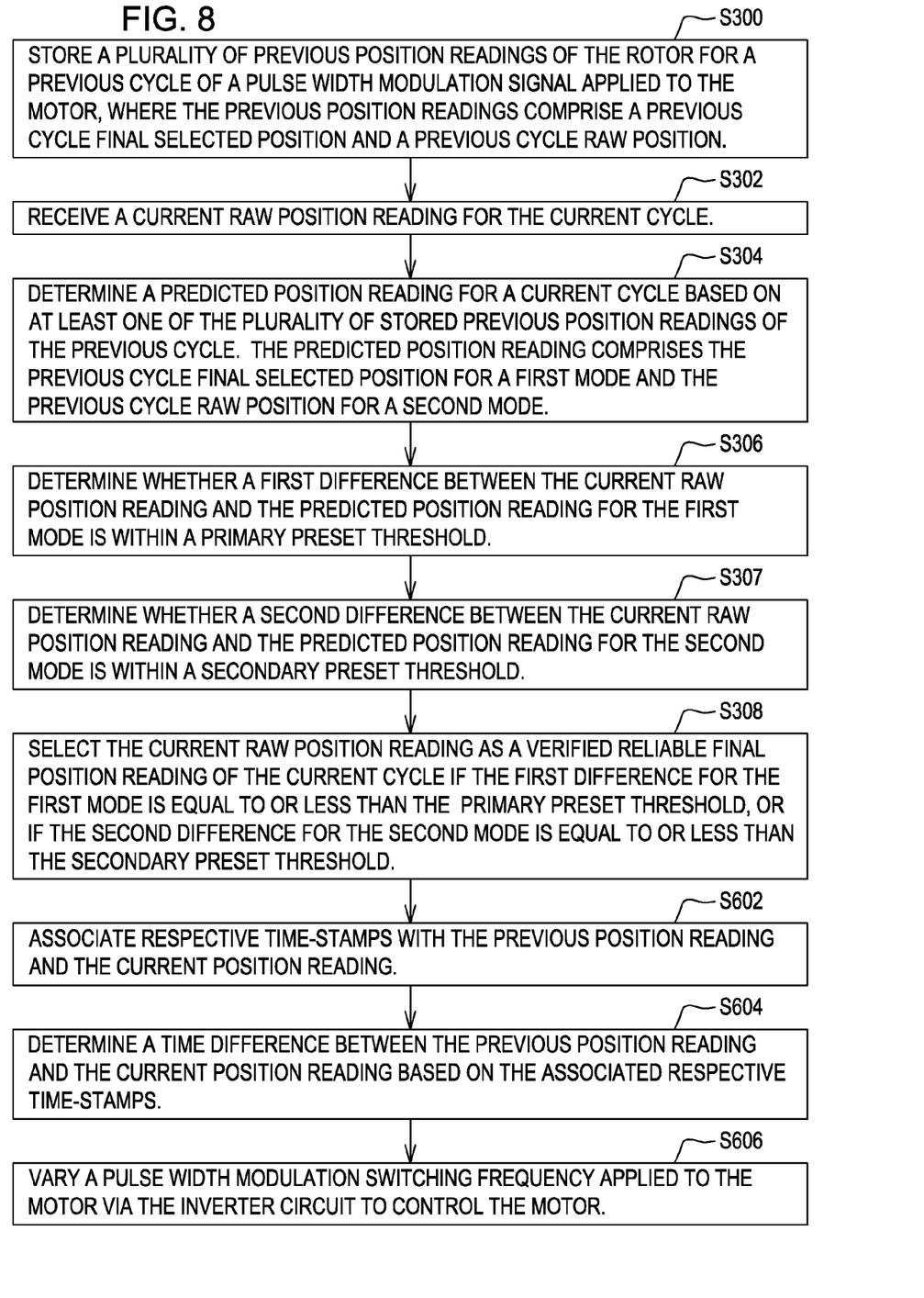
FIG. 8 is a flow chart of a fourth embodiment of a method for controlling an electrical motor with noise reduction for position sensing.

The method of FIG. 8 is similar to the method of FIG. 3, except the method of FIG. 8 includes additional steps S602, S604 and S606. Like reference numbers indicate like steps or procedures in FIG. 3 and FIG. 8.

Steps S300, S302, S304, S306, and S308 are described above in conjunction with FIG. 3.

In step S602, the data processing system 120, the data processor 264, the primary processing module 114, or the sensor 115 associates respective time-stamps with the previous raw position reading and the current raw position reading. For example, the sensor 115 may time stamp each current position reading and the primary processing module 114 may retrieve previous position readings and associated time stamps.

In step S604, the data processing system 120, the data processor 264 or the primary processing module 114 determines a time difference between the previous raw position reading and the current raw position reading based on the associated respective time-stamps.

In step S606, the time period used to calculate predicted position is adjusted when the data processing system 120 or the pulse width modulation generation module 112 varies a pulse width modulation switching frequency applied to the motor 117 via the inverter circuit 188 to control the motor 117.

If sensor 115 comprises a resolver that is not a brushless resolver, the method and system herein is well-suited for reducing or minimizing the deleterious effects of the electromagnetic noise generated at the electrical and mechanical interface of an armature or brushes of the resolver, for instance. Further, the method and system herein facilitates the reduction of electromagnetic noise in the data processing system 120 from parasitic or transient motor electromagnetic fields may be induced into proximate electrical components of the sensor or the electronic hardware. The method and system is well-suited for reducing the electromagnetic noise that would otherwise contribute to an inaccurate position reading of the rotor position; hence, improving the accuracy of control signals applied to the motor by the inverter.

Having described the preferred embodiment, it will become apparent that various modifications can be made without departing from the scope of the invention as defined in the accompanying claims.

The following is claimed:

1. A method of determining a position of a rotor in a motor, the method comprising:
    storing a plurality of previous position readings of the rotor for a previous cycle of a pulse width modulation signal applied to the motor, the previous position readings comprising a previous cycle final selected position and a previous cycle raw position;
    receiving a current raw position reading for the current cycle;
    determining a predicted position reading for a current cycle based on at least one of the plurality of stored previous position readings of the previous cycle, the predicted position reading comprising the previous cycle final selected position for a first mode and the previous cycle raw position for a second mode;
    determining whether a first difference between the current raw position reading and the predicted position reading for the first mode is within a primary preset threshold;
    determining whether a second difference between the current raw position reading and the predicted position reading for the second mode is within a secondary preset threshold; and
    selecting the current raw position reading as a verified reliable final position reading of the current cycle if the first difference for the first mode is equal to or less than the primary preset threshold or if the second difference for the second mode is equal to or less than the secondary preset threshold.

2. The method according to claim 1 further comprising:
    selecting the predicted position for the first mode as a final selected position reading of current cycle if the first difference for the first mode is larger than the primary preset threshold and the second difference for the second mode is larger than the secondary preset threshold.

3. The method according to claim 1 further comprising:
    selecting the verified reliable final position reading of current cycle by evaluation of a first difference between the current raw position reading and the current predicted position based on previous cycle final selected position and a second difference between the current raw position reading and the current predicted position based on previous cycle raw position.

4. The method according to claim 3 wherein the selecting further comprises selecting the current raw position as the verified reliable final position reading of current cycle if at least one of the first difference and the second difference is less than or equal to their respective primary and secondary preset thresholds.

5. The method according to claim 3 wherein the selecting further comprises selecting the predicted position based on previous cycle final selected position as the verified reliable final position reading of current cycle if both of the first difference and the second difference are greater than their respective primary and secondary preset thresholds.

6. The method according to claim 1 further comprising:
    detecting whether the predicted position is consecutively used as the verified reliable final position for more than a maximum count number, and
    switch off or reset the controller if the predicted position is consecutively used as the verified reliable final position for more than the maximum count number, where the maximum count number is a positive integer greater than three.

7. The method according to claim 1 further comprising:
    associating respective time-stamps with the previous cycle raw position reading and the current cycle raw position reading;
    determining a time difference between the previous cycle raw position reading and the current cycle raw position reading based on the associated respective time-stamps; and
    adjusting the time period used for predicted position calculation when varying pulse width modulation switching frequency is applied to the motor to control the motor.

8. The method according to claim 1 wherein determining of the predicted position reading for the current cycle is based on the stored previous position reading from the previous cycle and a previous speed reading from the previous cycle.

9. The method according to claim 1 wherein determining the predicted position reading for the first mode for the current cycle is determined by the following equation:

$$\text{Pos\_pred\_2}a = \text{Pos\_1}a + \text{Spd\_read\_1} * P1,$$

where Pos_pred_2*a* is the predicted position reading for the current cycle based on previous cycle raw position, Pos_1*a* is the previous raw position reading for the previous cycle, Spd_read_1 is the previous speed reading from the previous cycle, and P1 is the time difference between raw position reading times for the previous cycle and the current cycle.

10. The method according to claim 1 wherein determining the predicted position reading for the second mode for the current cycle is determined by the following equation:

$$\text{Pos\_pred\_2}b = \text{Pos\_1}b + \text{Spd\_read\_1} * P1,$$

where Pos_pred_2*b* is the predicted position reading for the current cycle based on previous cycle final selected position, Pos_1*b* is the final selected position reading for the previous cycle, Spd_read_1 is the previous speed reading from the previous cycle, and P1 is the time difference between raw position reading times for the previous cycle and the current cycle.

11. A method of determining a position of a rotor in a motor with reduced noise, the method comprising:
    storing a plurality of previous position readings of the rotor for a previous cycle of a pulse width modulation signal applied to the motor, the previous position readings comprising a previous cycle final selected position and previous cycle raw position;
    receiving a current raw position reading for the current cycle of the pulse width modulation signal;
    determining a predicted position reading for a current cycle based on the stored previous position readings of the previous cycle in accordance with a first mode or a second mode, where the first mode uses the previous cycle final selected position and where the second mode uses the previous cycle raw position;

determining whether a difference between at least one of the predicted positions based on previous position readings and the current raw position reading is within a preset threshold; and selecting the current raw position reading as a verified reliable final position reading of current cycle if the difference is equal to or less than the preset threshold.

12. The method according to claim 11 wherein the determining whether the difference further comprises the following:

in the first mode, determining if a first difference between the current raw position reading and the predicted position based on previous final selected position is greater than a primary preset threshold as the preset threshold;

in the second mode, determining if a second difference between the current raw position reading and the predicted position based on previous raw position reading is greater than a secondary preset threshold as the preset threshold.

13. The method according to claim 12 wherein the selecting further comprises:

selecting the current raw position reading as a verified reliable final position reading of current cycle if the first difference is equal to or less than the primary preset threshold or if the second difference is equal to or less than the secondary preset threshold.

14. The method according to claim 12 wherein the selecting further comprises:

selecting the predicted position for the first mode or second mode as a verified reliable final position reading of current cycle if the first difference and the second difference each are larger than the preset threshold.

15. The method according to claim 12 further comprising:

selecting the predicted position based on previous final selected position reading as the verified reliable final position reading of current cycle if the first difference and the second difference are each greater than the preset threshold.

16. The method according to claim 12 wherein the selecting further comprises:

selecting the current raw position as the verified reliable final position reading of current cycle if the first difference is less than or equal to the primary threshold or if the second difference is less than or equal to than the primary preset threshold.

17. The method according to claim 12 wherein the selecting further comprises:

selecting the predicted position based on previous cycle raw position as the verified reliable final position reading of current cycle if each of the first difference and second difference is less than or equal to the preset threshold.

18. A system of determining a position of a rotor in a motor, the system comprising:

a data storage device for storing a plurality of previous position readings of the rotor for a previous cycle of a pulse width modulation signal applied to the motor, the previous position readings comprising a previous cycle final selected position and a previous cycle raw position;

a data port for receiving a current raw position reading for the current cycle from a sensor;

a data processor for executing software instructions within a primary processing module for determining a predicted position reading for a current cycle based on at least one of the plurality of stored previous position readings of the previous cycle, the predicted position reading comprising the previous cycle final selected position for a first mode and the previous cycle raw position for a second mode, the primary processing module comprising the software instructions stored in the data storage device on a non-transitory basis and adapted to cause the data processor to determine whether a difference between the current raw position reading and the predicted position reading for the first mode and the second mode is within a preset threshold, the primary processing module adapted to select the current raw position reading as a verified reliable final position reading if the difference is equal to or less than the preset threshold.

19. The system according to claim 18 wherein the primary data processing module is adapted to select the verified reliable final position reading by evaluation of a first difference between the current raw position reading and the predicted position based on previous cycle final selected position and a second difference between the predicted position based on current raw position reading and the previous cycle raw position.

20. The system according to claim 18 wherein the primary data processing module is adapted to select the current raw position as the verified reliable final position reading if at least one of the first difference or the second difference is less than or equal to than the preset threshold.

21. The system according to claim 18 wherein the primary data processing module is adapted to select the predicted position based on previous cycle final selected position as the verified reliable final position reading of current cycle if each of the first difference and the second difference is greater than the preset threshold.

22. The system according to claim 18 wherein the primary data processing module is adapted to select the predicted position based on previous cycle raw position as the verified reliable final position reading of current cycle if each of the first difference and the second difference is less than or equal to the preset threshold.

* * * * *